(12) United States Patent
Ohba et al.

(10) Patent No.: US 10,673,739 B2
(45) Date of Patent: Jun. 2, 2020

(54) DETOUR ROUTING FOR MESH NETWORK

(71) Applicant: INTERNATIONAL BUSINESS MACHINES CORPORATION, Armonk, NY (US)

(72) Inventors: Nobuyuki Ohba, Miyagi-ken (JP); Yasuteru Kohda, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 15/943,840

(22) Filed: Apr. 3, 2018

(65) Prior Publication Data

US 2019/0306049 A1    Oct. 3, 2019

(51) Int. Cl.
| | |
|---|---|
| *H04L 12/733* | (2013.01) |
| *H04L 12/707* | (2013.01) |
| *H04W 84/18* | (2009.01) |
| *H04L 12/751* | (2013.01) |

(52) U.S. Cl.
CPC .......... *H04L 45/122* (2013.01); *H04L 45/026* (2013.01); *H04L 45/20* (2013.01); *H04L 45/22* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 9,379,971 | B2 | 6/2016 | Sem-Jacobsen et al. |
| 9,647,921 | B2 | 5/2017 | Rangan et al. |
| 2019/0058651 | A1* | 2/2019 | McDonald ............ H04L 45/122 |

OTHER PUBLICATIONS

Bahrebar, et al., "Adaptive and reconfigurable fault-tolerant routing method for 2D networks-on-chip", Proceedings International Conference on Reconfigurable Computing and FPGAs, Dec. 2014, 1 page.
Chen at al., "Fault-Tolerant Routing Algorithm for Meshes Without Using Virtual Channels", Journal of Information Science and Engineering, Feb. 1998, pp. 765-783.

(Continued)

*Primary Examiner* — Ayaz R Sheikh
*Assistant Examiner* — Sori A Aga
(74) *Attorney, Agent, or Firm* — Tutunjian & Bitetto, P.C.; Vazken Alexanian

(57) ABSTRACT

A method is provided for detour routing in a mesh network that includes nodes and bi-directional links connecting neighboring nodes. The method identifies any primary links useable to decrease a path distance from a source to a destination node. The method randomly selects one primary link for use, responsive to identifying more than one primary link that is non-defective. The method identifies any secondary links useable to decrease the path distance and orthogonal to a primary link, responsive to the primary links being defective. The method randomly selects one secondary link for use, responsive to identifying more than one secondary link that is non-defective. The method identifies any tertiary links useable to decrease the path distance and reverse in direction to a primary link, responsive to the secondary links being defective. The method sends a packet from the source to the destination node using the identified tertiary links.

20 Claims, 16 Drawing Sheets

(56) References Cited

OTHER PUBLICATIONS

Ebrahimi, et al., "MD: Minimal Path-Based Fault-Tolerant Routing in On-Chip Networks", 18th Asia and South Pacific Design Automation Conference (ASP-DAC), Jan. 2013, 6 pages.
Lin et al., "Traffic-Balanced Routing Algorithm for Irregular Mesh-Based On-Chip Networks", IEEE Transactions on Computers, Sep. 2008, pp. 1156-1168, vol. 57, No. 9.
Wu, Jie, "A Fault-Tolerant and Deadlock-Free Routing Protocol in 2D Meshes Based on Odd-Even Turn Model", IEEE Transactions on Computers, Sep. 2003, pp. 1154-1169, vol. 52, No. 9.

\* cited by examiner

DETOUR ROUTING FOR MESH NETWORK

BACKGROUND

Technical Field

The present invention relates generally to information processing and, in particular, to detour routing for a mesh network.

Description of the Related Art

A Mesh network is widely used for a Network On Chip (NOC). The chip typically includes a number of nodes and links. Failures of links can happen during fabrication and even while the chip is operating. However, if the chip has a defective link and has no workaround for it, the chip cannot be used. Hence, there is a need for a way to overcome such defective links.

SUMMARY

According to an aspect of the present invention, a computer-implemented method is provided for detour routing in a mesh network that includes a plurality of nodes and a plurality of bi-directional links connecting neighboring ones of the plurality of nodes. The method includes identifying, from among the plurality of links, any primary candidate links useable to decrease a path distance from a source node to a destination node. The method further includes randomly selecting one of the primary candidate links for use, responsive to an identification of more than one of the primary candidate links that is non-defective. The method also includes identifying, from among the plurality of links, any secondary candidate links useable to decrease the path distance and orthogonal to at least one of the primary candidate links, responsive to all the primary candidate links being defective. The method additionally includes randomly selecting one of the secondary candidate links for use, responsive to an identification of more than one of the secondary candidate links that is non-defective. The method further includes identifying, from among the plurality of links, any tertiary candidate links useable to decrease the path distance and reverse in direction to at least one of the primary candidate links, responsive to all of the secondary links being defective. The method also includes sending a packet from the source node to the destination node using the identified tertiary candidate links, responsive to an identification of the tertiary candidate links.

According to another aspect of the present invention, a computer program product is provided for detour routing in a mesh network that includes a plurality of nodes and a plurality of bi-directional links connecting neighboring ones of the plurality of nodes. The computer program product includes a non-transitory computer readable storage medium having program instructions embodied therewith. The program instructions are executable by a computing element to cause the computing element to perform a method. The method includes identifying, from among the plurality of links, any primary candidate links useable to decrease a path distance from a source node to a destination node. The method further includes randomly selecting one of the primary candidate links for use, responsive to an identification of more than one of the primary candidate links that is non-defective. The method also includes identifying, from among the plurality of links, any secondary candidate links useable to decrease the path distance and orthogonal to at least one of the primary candidate links, responsive to all the primary candidate links being defective. The method additionally includes randomly selecting one of the secondary candidate links for use, responsive to an identification of more than one of the secondary candidate links that is non-defective. The method further includes identifying, from among the plurality of links, any tertiary candidate links useable to decrease the path distance and reverse in direction to at least one of the primary candidate links, responsive to all of the secondary links being defective. The method also includes sending a packet from the source node to the destination node using the identified tertiary candidate links, responsive to an identification of the tertiary candidate links.

According to yet another aspect of the present invention, a system is provided. The system includes a mesh network including a plurality of nodes and a plurality of bi-directional links connecting neighboring ones of the plurality of nodes. At least one of the plurality of nodes is configured to identify, from among the plurality of links, any primary candidate links useable to decrease a path distance from a source node to a destination node. The at least one of the plurality of nodes is further configured to randomly select one of the primary candidate links for use, responsive to an identification of more than one of the primary candidate links that is non-defective. The at least one of the plurality of nodes is also configured to identify, from among the plurality of links, any secondary candidate links useable to decrease the path distance and orthogonal to at least one of the primary candidate links, responsive to all the primary candidate links being defective. The at least one of the plurality of nodes is additionally configured to randomly select one of the secondary candidate links for use, responsive to an identification of more than one of the secondary candidate links that is non-defective. The at least one of the plurality of nodes is further configured to identify, from among the plurality of links, any tertiary candidate links useable to decrease the path distance and reverse in direction to at least one of the primary candidate links, responsive to all of the secondary links being defective. The at least one of the plurality of nodes is also configured to send a packet from the source node to the destination node using the identified tertiary candidate links, responsive to an identification of the tertiary candidate links.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to detour routing for a mesh network.

In an embodiment, the present invention manages link failures and improves link availability.

In an embodiment, the present invention provides a packet routing scheme that finds alternative paths to the destination by bypassing defective links.

In an embodiment, the present invention advantageously does not require virtual channels, does not require the disabling of good (properly operating) nodes/links.

In an embodiment, the present invention can be simply and easily implemented in hardware.

In an embodiment, the present invention provides link failure protection.

Figure 1:
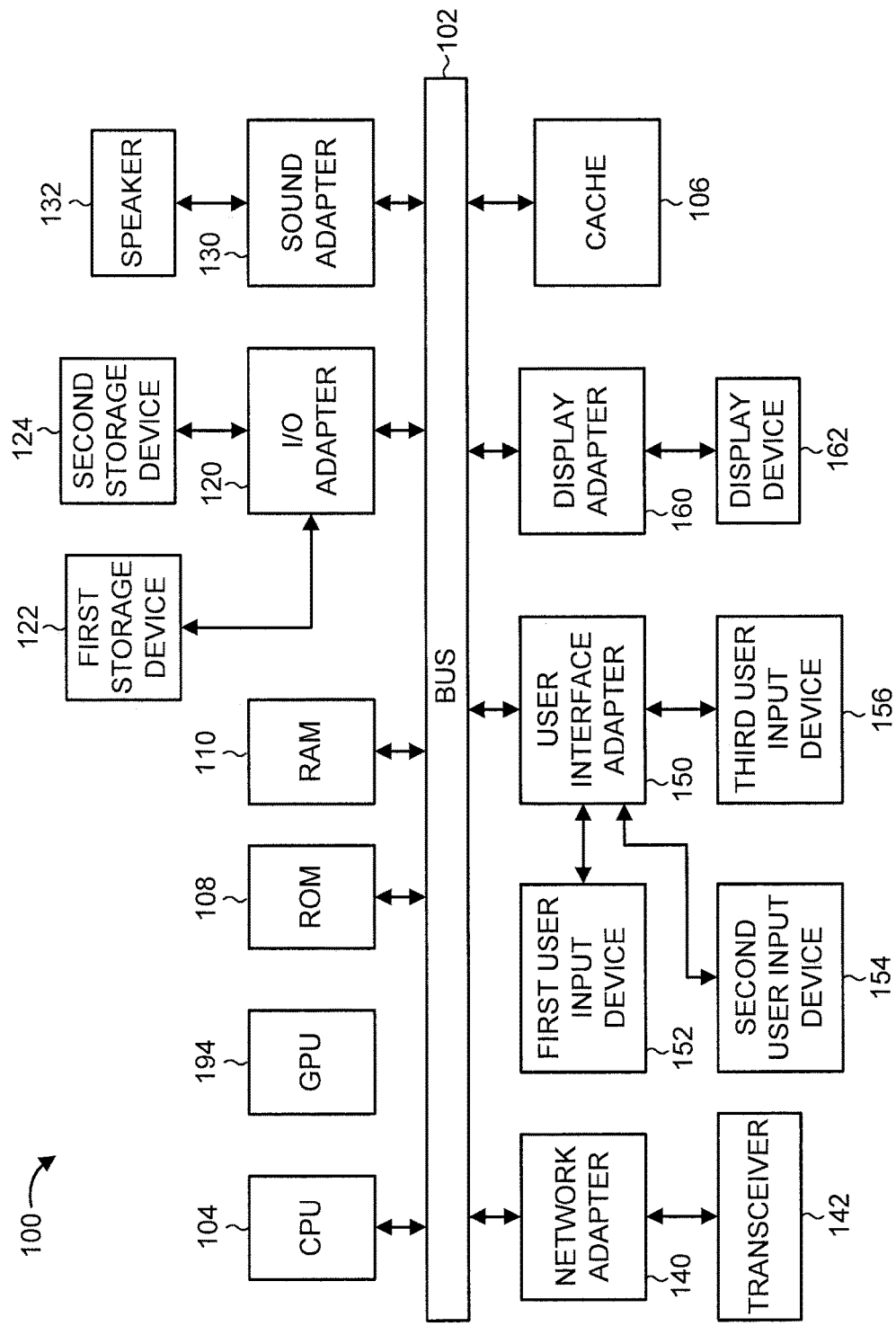
FIG. 1 is a flow diagram showing an exemplary processing system to which the invention principles may be applied, in accordance with an embodiment of the present invention.

FIG. 1 is a flow diagram showing an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 5:
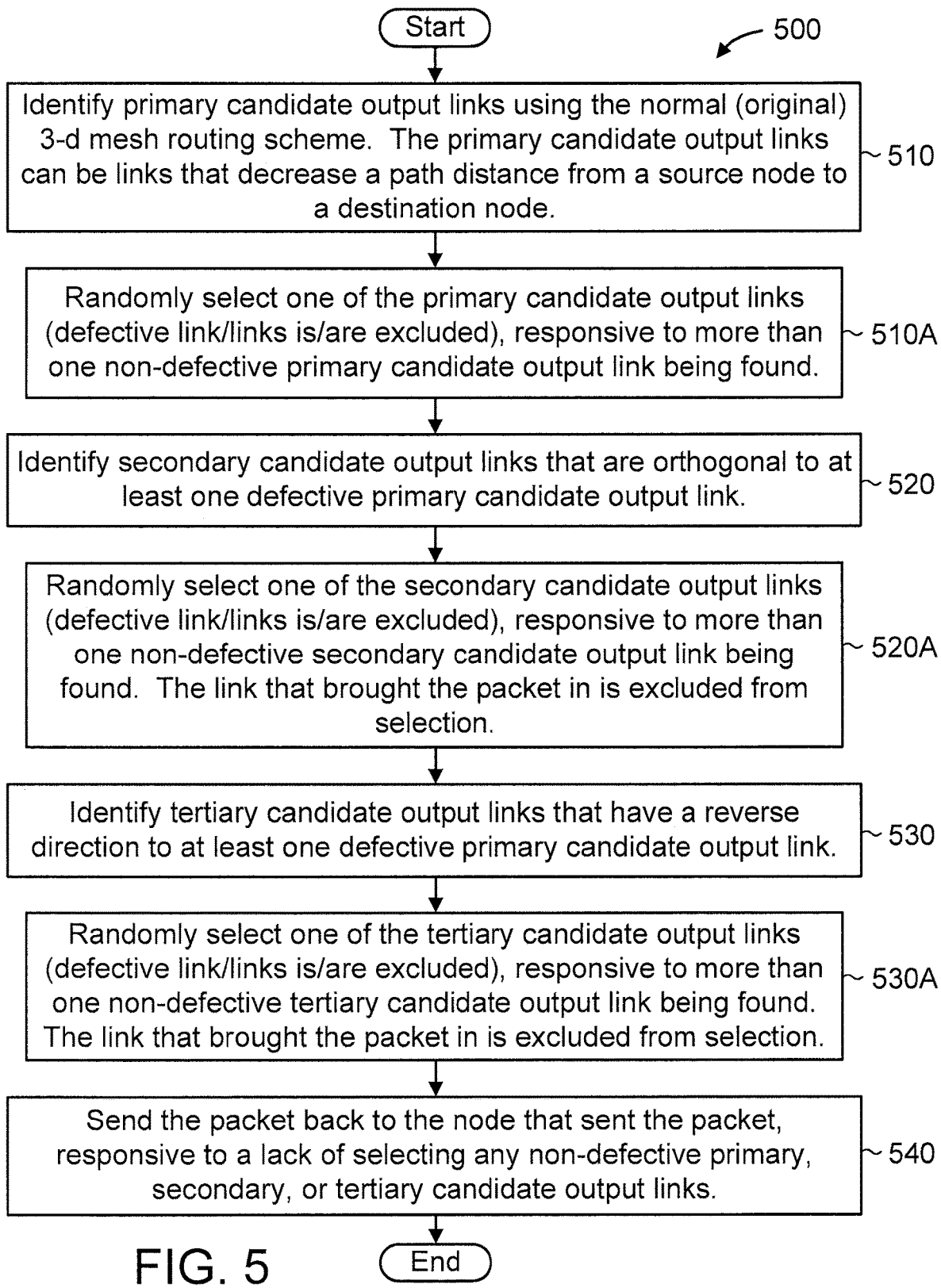
FIG. 5 is a flow diagram showing an exemplary method for detour routing for a mesh network, in accordance with an embodiment of the present invention.

It is to be appreciated that processing system 100 may perform at least part of the method described herein including, for example, at least part of method 500 of FIG. 5.

Figure 2:
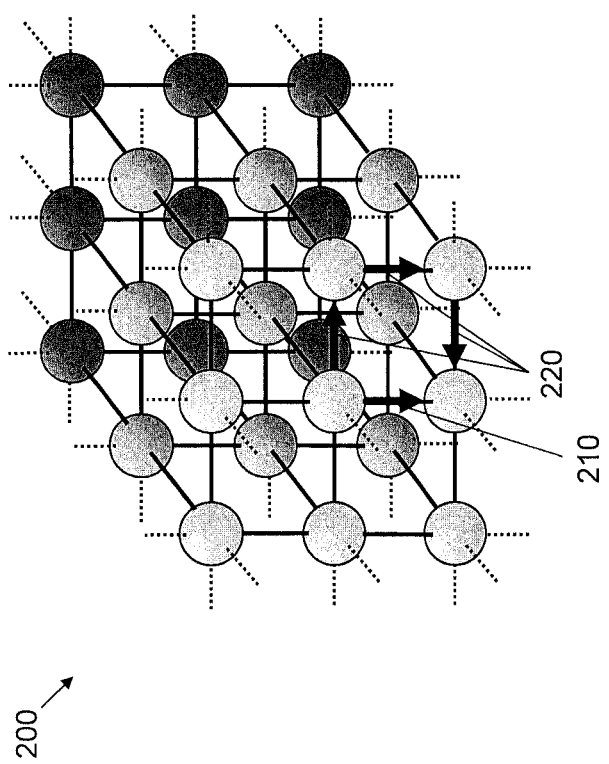
FIG. 2 is a block diagram showing an exemplary graphical overview of the present invention with respect an exemplary 3D mesh, in accordance with an embodiment of the present invention.

FIG. 2 is a block diagram showing an exemplary graphical overview 200 of the present invention with respect an exemplary 3D mesh 299, in accordance with an embodiment of the present invention.

In essence, as shown relative to the graphical overview 200, the present invention detects defective links in a 3D mesh, such as defective link 210, and determines an optimal detour path 220 that bypasses the defective link. In this way, operation of the functionality implemented by the 3D mesh can be preserved.

Figure 3:
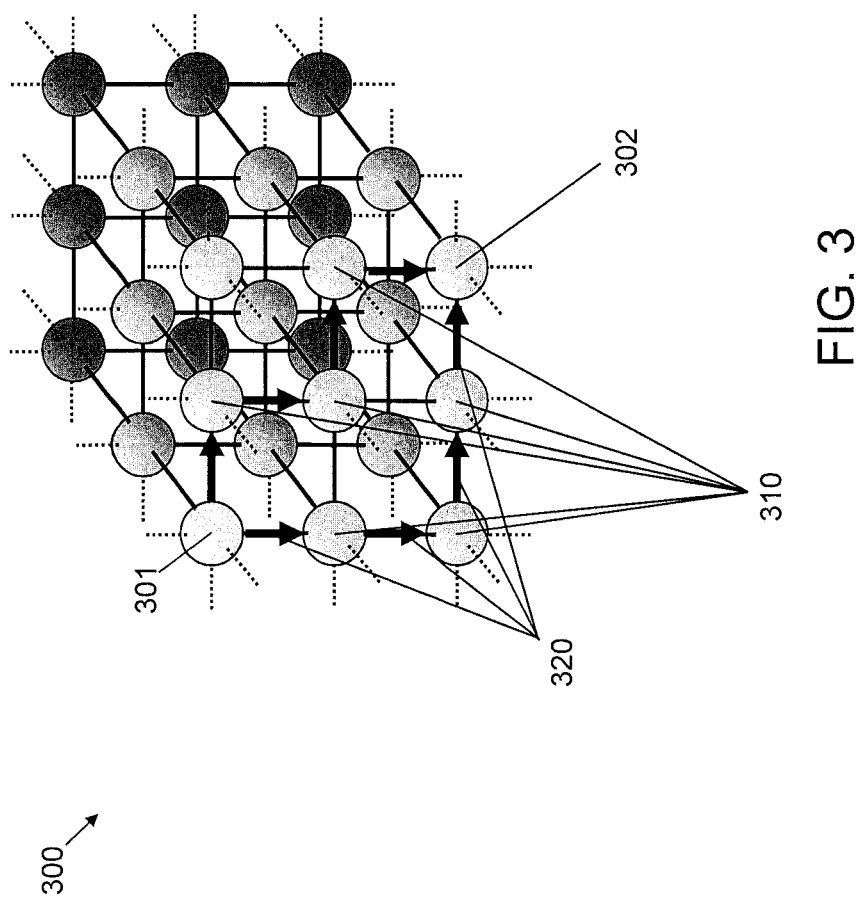
FIG. 3 is a block diagram showing an exemplary 3D mesh to which the present invention can be applied, in accordance with an embodiment of the present invention.

FIG. 3 is a block diagram showing an exemplary 3D mesh 300 to which the present invention can be applied, in accordance with an embodiment of the present invention.

The 3D mesh 300 includes a source node 301, a destination node 302, intermediate nodes 310, and alternative paths 320.

Regarding the 3D mesh 300, the following notations apply:
(1) Source node 301: Ns (Xs, Ys, Zs)
(2) Destination node 302: Nd (Xd, Yd, Zd)
(3) Current (intermediate) node 310: Ni (Xi, Yi, Zi)

Regarding the 3D mesh 300, the following scheme information applies:
(1) $\Delta X \equiv |Xd-Xi|$, $\Delta Y \equiv |Yd-Yi|$, $\Delta Z \equiv |Zd-Zi|$ (2) Definition: Distance (Nd, Ni)=ΔX+ΔY+ΔZ
(3) Set Xs→Xi, Ys→Yi, Zs→Zi
(4) Select output link so that ΔX or ΔY or ΔZ decrements
(5) If two or three links are candidates for the output link, select one of them randomly.

Figure 4:
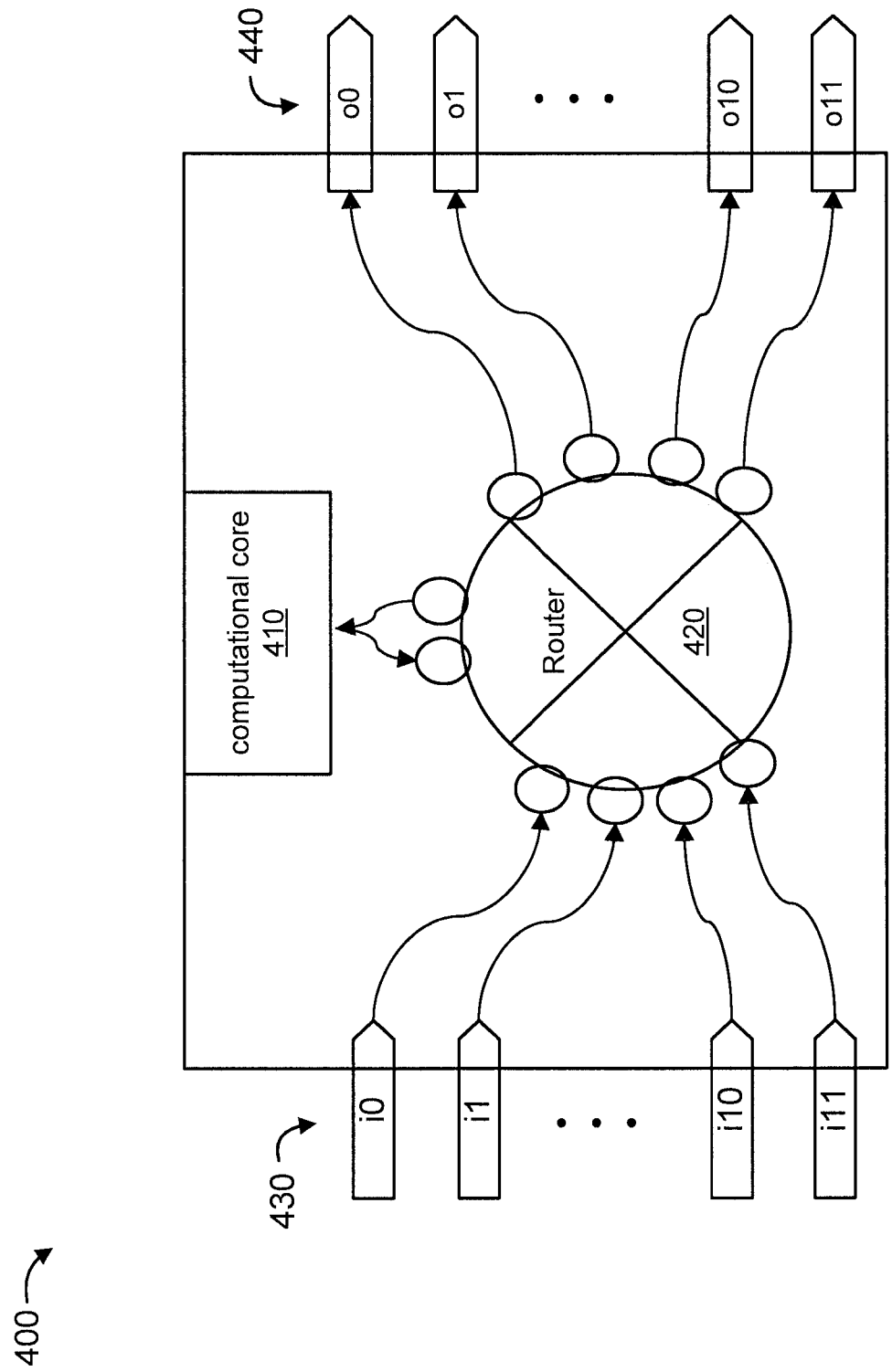
FIG. 4 is a block diagram showing an exemplary node that can be utilized in a mesh network, in accordance with an embodiment of the present invention.

FIG. 4 is a block diagram showing an exemplary node 400 that can be utilized in a mesh network, in accordance with an embodiment of the present invention. For example, the node 400 can be a node in any of the 3D mesh networks shown and described herein.

The node 400 can include a computational core 410, a router 420, input links 430, and output links 440.

The node 400 can involve the following assumptions:
(1) The defective condition is only known by the boundary nodes. No global information distributed to the other nodes.
(2) Special packets for error notification are not used. Each node autonomously projects the link status of neighbors.
(3) Each link is bi-directional. Each node periodically sends check-alive packets to see whether the link is working properly or not.
(4) Each node 400 has a computational core 410 and a router 420.

FIG. 5 is a flow diagram showing an exemplary method 500 for detour routing for a mesh network, in accordance with an embodiment of the present invention.

In general, method 500 uses a hierarchical candidate link identification process to identify alternate paths for transmitting a packet from a source node to a destination node in a mesh network. Such alternate paths can determined in order to find a short path than an original path or can be determined due to the existence of a broken or otherwise inoperable link(s) in the original path. At each level of the hierarchical candidate link identification process, if an acceptable candidate link(s) is found, then the search is terminated and that acceptable candidate link(s) is used to form an alternate path. The hierarchical candidate link identification process can be considered to include a primary candidate level, a second candidate level, and a tertiary candidate level, respectively corresponding to primary candidate links, secondary candidate links, and tertiary candidate links. In at least the embodiment of FIG. 5, the secondary candidate links are orthogonal to at least one of the primary candidate links, and the tertiary candidate links are reverse (directionally) to at least one of the primary candidate links.

FIG. 5 includes blocks 510, 520, 530, and 540.

Figure 6:
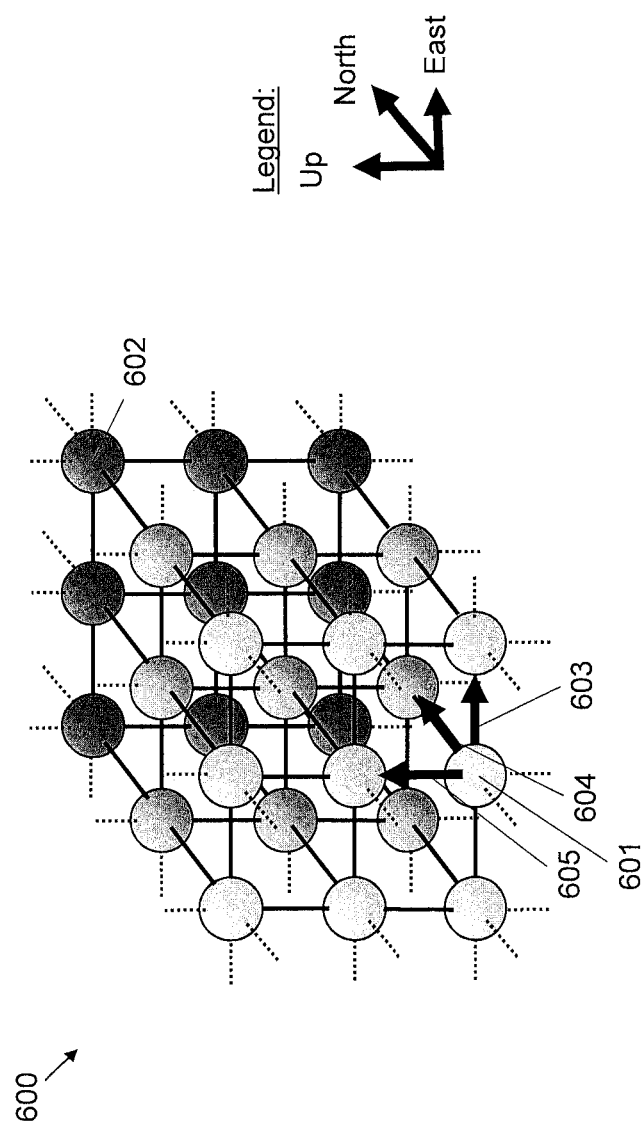
FIG. 6 is a block diagram graphically showing an exemplary implementation of a block of the method of FIG. 5, in accordance with an embodiment of the present invention.

FIG. 6 is a block diagram graphically showing an exemplary implementation 600 of block 510 of the method 500 of FIG. 5, in accordance with an embodiment of the present invention.

Figure 7:
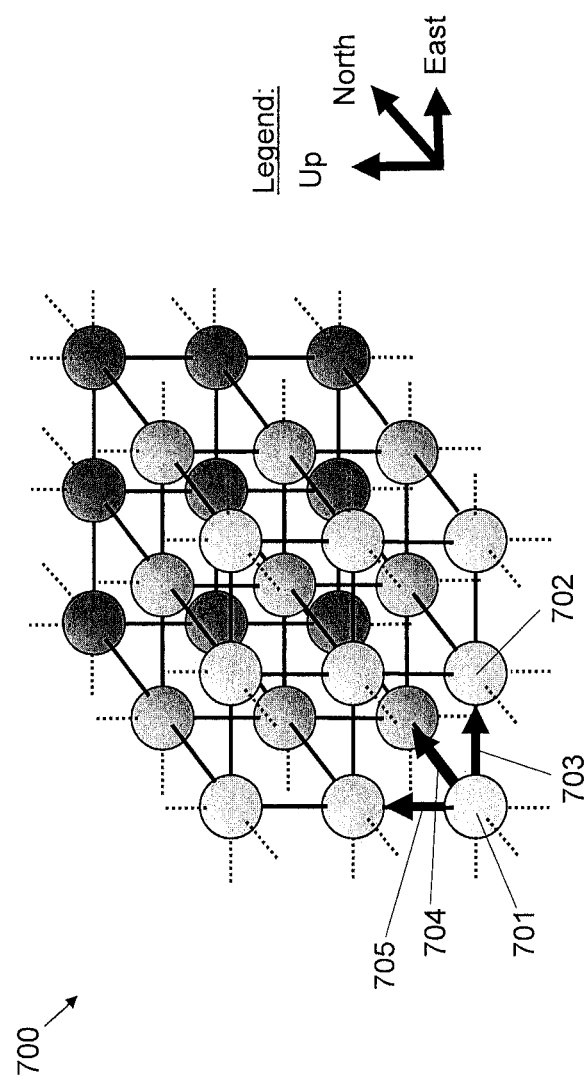
FIG. 7 is a block diagram graphically showing an exemplary implementation of a block of the method of FIG. 5, in accordance with an embodiment of the present invention.

FIG. 7 is a block diagram graphically showing an exemplary implementation 700 of block 520 of the method 500 of FIG. 5, in accordance with an embodiment of the present invention.

Figure 8:
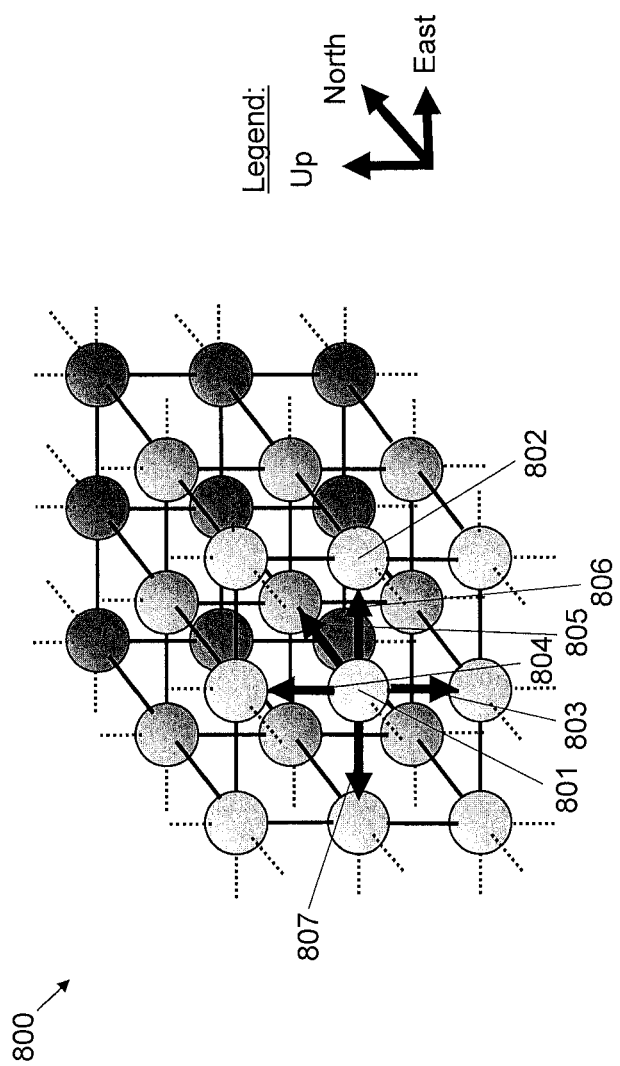
FIG. 8 is a block diagram graphically showing an exemplary implementation of a block of the method of FIG. 5, in accordance with an embodiment of the present invention.

FIG. 8 is a block diagram graphically showing an exemplary implementation 800 of block 530 of the method 500 of FIG. 5, in accordance with an embodiment of the present invention.

Figure 9:
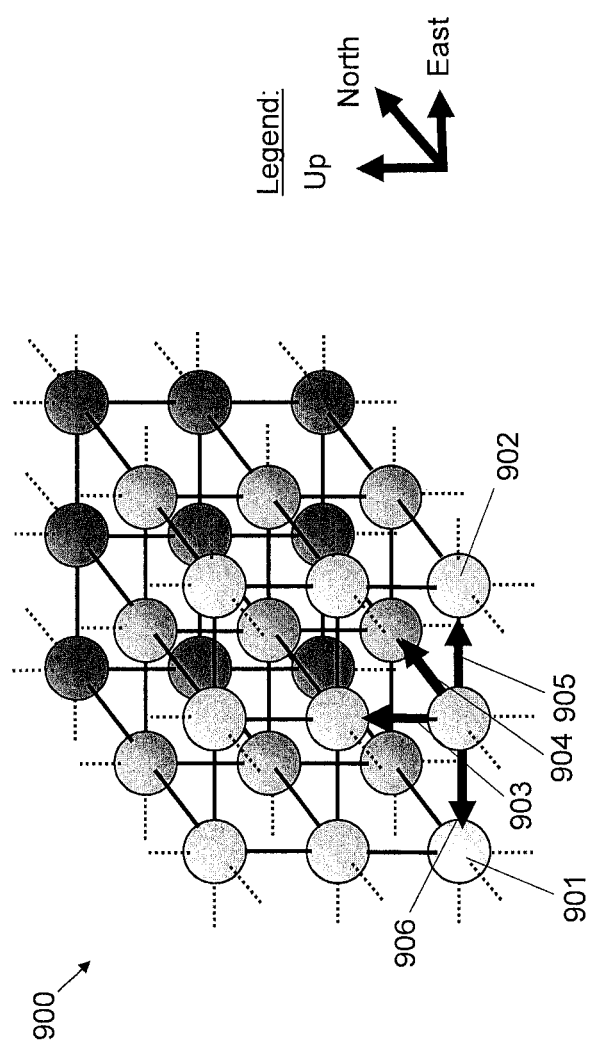
FIG. 9 is a block diagram graphically showing an exemplary implementation of a block of the method of FIG. 5, in accordance with an embodiment of the present invention.

FIG. 9 is a block diagram graphically showing an exemplary implementation 900 of block 540 of the method 500 of FIG. 5, in accordance with an embodiment of the present invention.

Referring to FIGS. 5 and 6, at block 510, identify primary candidate output links using the normal (original) 3-d mesh routing scheme. The primary candidate output links can be links that decrease a path distance from a source node to a destination node.

In an embodiment, block 510 can include block 510A.

At block 510A, randomly select one of the primary candidate output links (defective link/links is/are excluded), responsive to more than one non-defective primary candidate output link being found. In the example of FIG. 6, node 601 is a source node, node 602 is a destination node, and there are three primary candidate output links, namely the East link 603, the North link 604, and the up link 605. The East link 603 is defective, the North link 604 and the up link 605 are non-defective. Hence, the North link 604 or the up link 605 is randomly selected.

Referring to FIGS. 5 and 7, at block 520, identify secondary candidate output links that are orthogonal to at least one defective primary candidate output link.

In an embodiment, block 520 can include block 520A.

At block 520A, randomly select one of the secondary candidate output links (defective link/links is/are excluded), responsive to more than one non-defective secondary candidate output link being found. The link that brought the packet in is excluded from selection. In the example of FIG. 7, node 701 is a source node, node 702 is a destination node, and there are three secondary candidate output links, namely the East link 703, the North link 704, and the up link 705. The East link 703 is defective, the North link 704 and the up link 705 are non-defective. Hence, the North link 704 or the up link 705 is randomly selected.

Referring to FIGS. 5 and 8, at block 530, identify tertiary candidate output links that have a reverse direction to at least one defective primary candidate output link.

In an embodiment, block 530 can include block 530A.

At block 530A, randomly select one of the tertiary candidate output links (defective link/links is/are excluded), responsive to more than one non-defective tertiary candidate output link being found. The link that brought the packet in is excluded from selection. In the example of FIG. 8, node 801 is a source node, node 802 is a destination node, and there are four secondary candidate output links, namely the up link 804, the down link 803, the West link 807, the East link 806, and the North link 805. The up link 804, the down link 803, the East link 806, and the North link 805 are defective. The West link 807 is non-defective and, hence, is selected.

Referring to FIGS. 5 and 9, at block 540, send the packet back to the node that sent the packet, responsive to a lack of selecting any non-defective primary, secondary, or tertiary candidate output links. In the example of FIG. 8, node 901 is a source node, node 902 is a destination node, and there are three tertiary candidate output links, namely the up link 903, the North link 904, the East link 905. Each of the three tertiary candidate output links 903, 904, and 905 are defective. Hence, the packet is sent back to the source node 901 via the input link 906 that provided it.

A description will now be given regarding link status protection and routing, in accordance with an embodiment of the present invention.

The description will be given relative to FIGS. 10 and 11.

Figure 10:
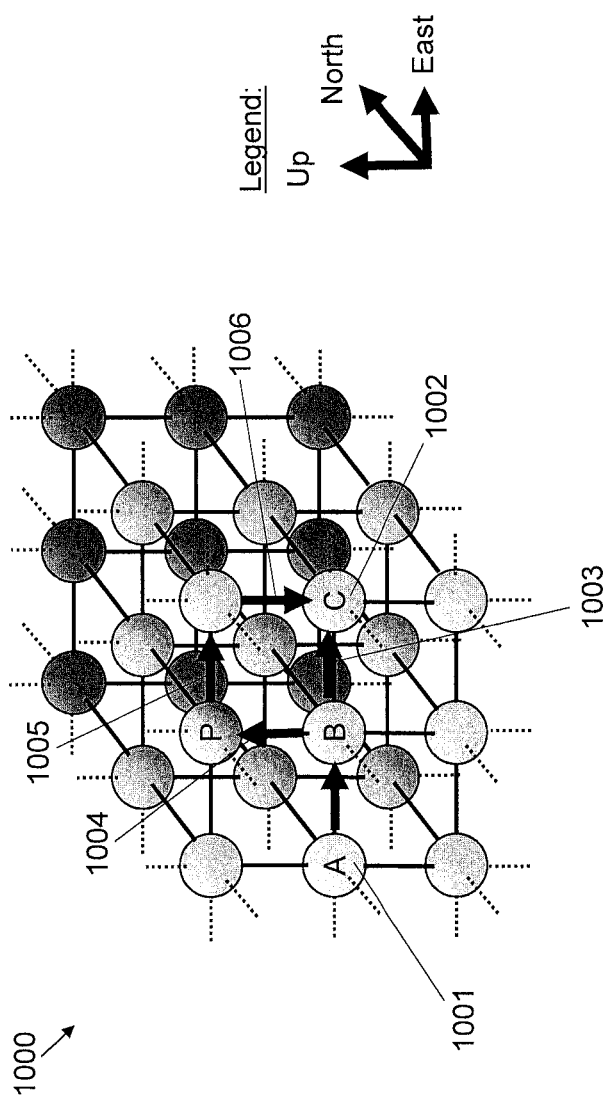
FIG. 10 is a block diagram showing an exemplary link status projection and routing, in accordance with an embodiment of the present invention.

FIG. 10 is a block diagram showing an exemplary link status projection and routing 1000, in accordance with an embodiment of the present invention. In FIG. 10, node 1001 is a source node and node 1002 is a destination node.

Figure 11:
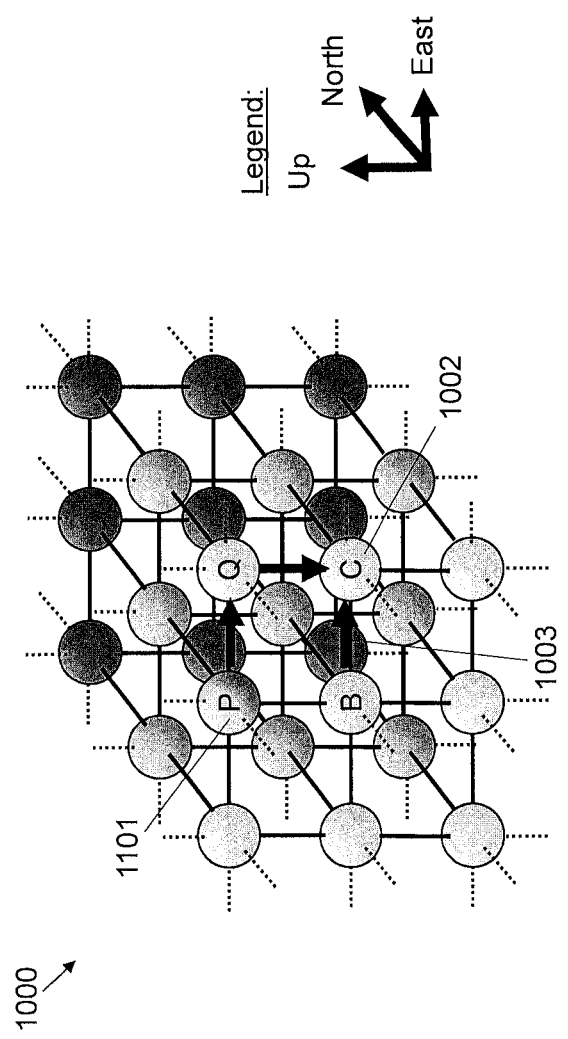
FIG. 11 is a block diagram further showing the exemplary link status projection and routing of FIG. 10, in accordance with an embodiment of the present invention.

FIG. 11 is a block diagram further showing the exemplary link status projection and routing 1000 of FIG. 10, in accordance with an embodiment of the present invention. In FIG. 11, node 1101 is a source node and node 1002 is a destination node.

Referring to FIG. 10, every node checks incoming packets whether they are on the shortest path or not.

In the example shown in FIG. 10, Node B sent a packet to Node P because the link 1003 from Node B to Node C is defective.

Node P calculates the distances, Distance(B,C) and Distance(P,C) with respect to a detour formed from links 1004, 1005, and 1006.

If Distance(P,C) is greater than Distance(B,C), then Node P projects the shortest link(s) (e.g., link 1003) departing from Node B is(are) defective.

Referring to FIG. 11, since then, Node P will not select Node B even if Node B is on the shortest path.

In the right example, Node P is going to send a packet to Node C. Node P selects Node Q as the next node because Node P knows the link 1003 from Node B to Node C is defective.

A description will now be given regarding link status notification, in accordance with an embodiment of the present invention.

The description will be given relative to FIG. 12.

Figure 12:
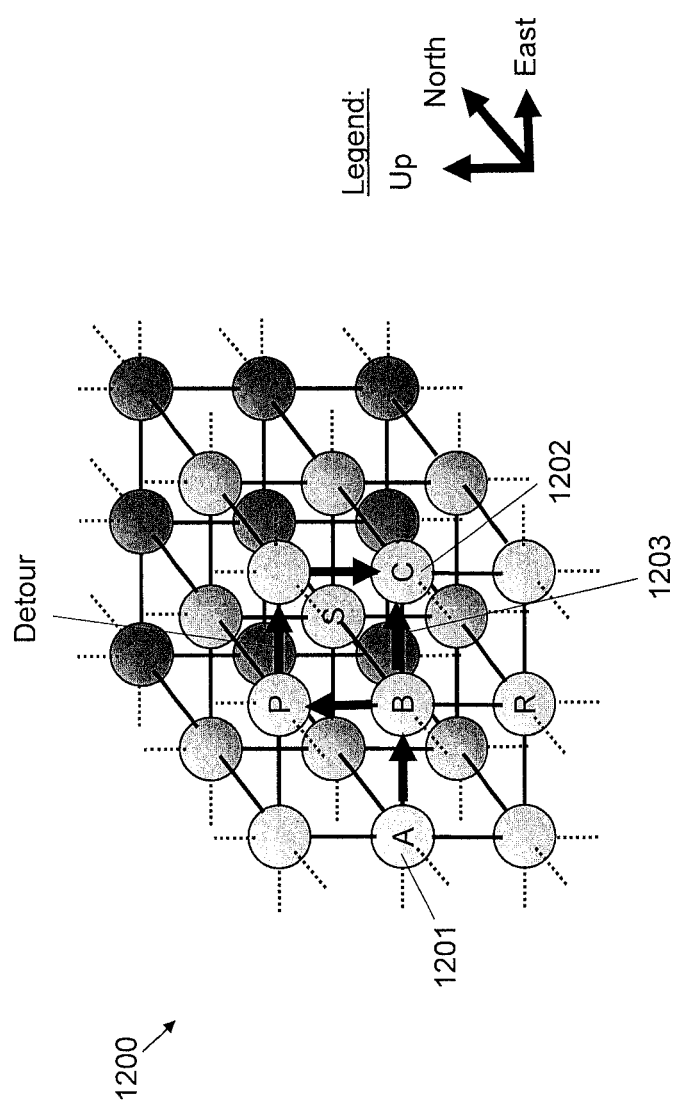
FIG. 12 is a block diagram showing an exemplary link status notification, in accordance with an embodiment of the present invention.

FIG. 12 is a block diagram showing an exemplary link status notification 1200, in accordance with an embodiment of the present invention. In FIG. 12, node 1201 is a source node and node 1202 is a destination node.

Node B attempts to use Nodes P, R, and S for a detour node as evenly as possible.

As a result, not only Node P but also Nodes R and S will know the link 1203 from Node B to Node C is defective.

A description will now be given regarding various aspects of the present invention, in accordance with an embodiment of the present invention.

The description will be given relative to FIG. 13.

Figure 13:
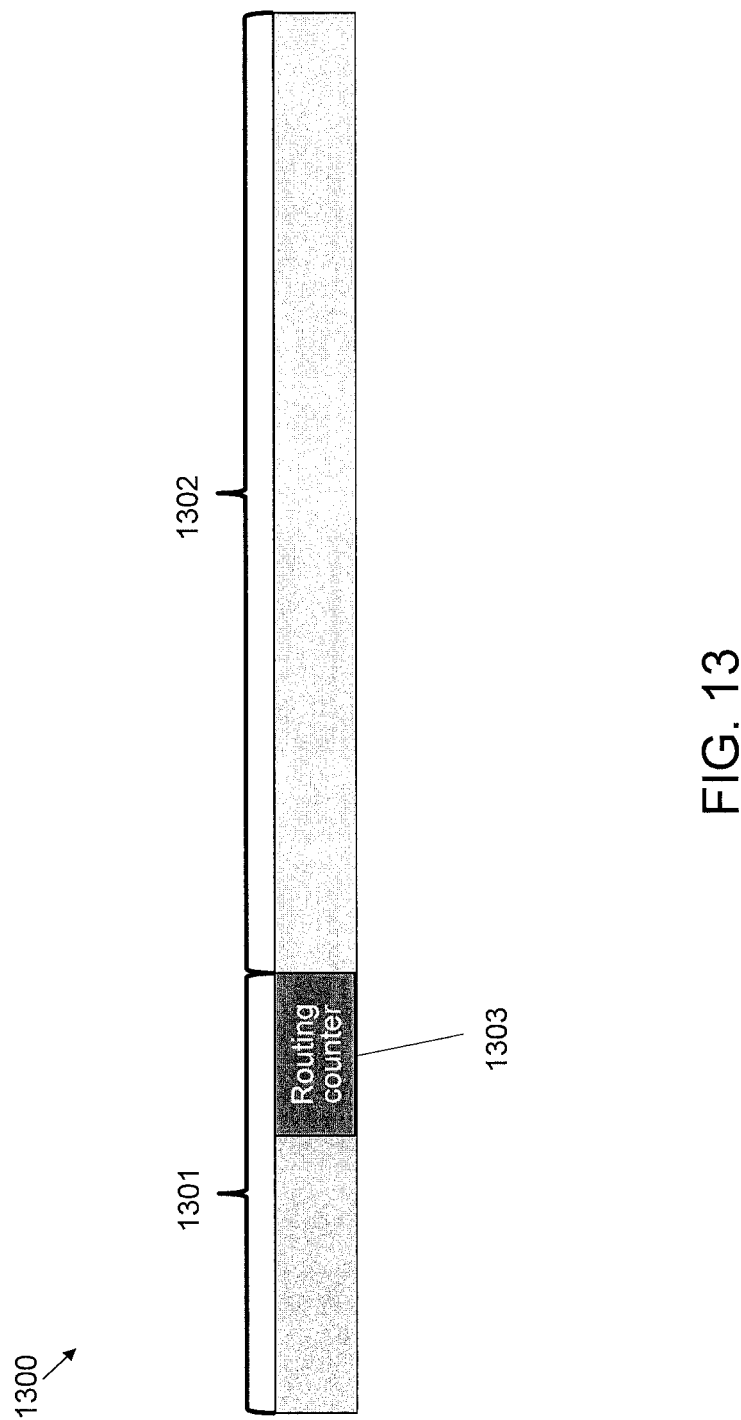
FIG. 13 is a block diagram showing an exemplary packet format to which the present invention can be applied, in accordance with an embodiment of the present invention.
Figure 14:
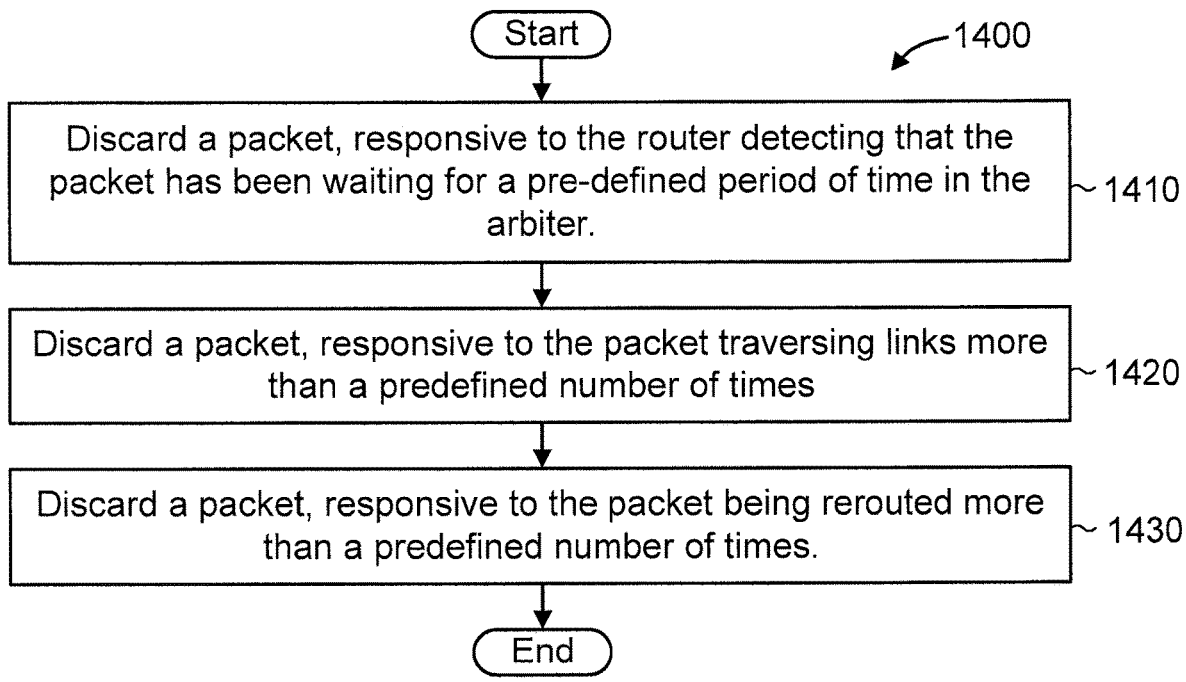
FIG. 14 is a block diagram showing exemplary packet discarding strategies 1400, in accordance with an embodiment of the present invention.

FIG. 13 is a block diagram showing an exemplary packet format 1300 to which the present invention can be applied, in accordance with an embodiment of the present invention. The packet format 1300 includes a header 1301, a payload 1302, and a routing counter 1303. FIG. 14 is a block diagram showing exemplary packet discarding strategies 1400, in accordance with an embodiment of the present invention.

The presented detour routing is not dead-lock free. Deadlock must be handled by other mechanisms. At block 1410, discard a packet, responsive to the router detecting that the packet has been waiting for a pre-defined period of time in the arbiter.

Regarding avoiding excessive packet rerouting: at block 1420, discard a packet, responsive to the packet traversing links more than a predefined number of times; and at block 1430, discard a packet, responsive to the packet being rerouted more than a predefined number of times.

Resending packet will be implemented in higher network layers, for example, in Transmission Control Protocol (TCP).

Packet discarding would be acceptable for the neural network operation

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
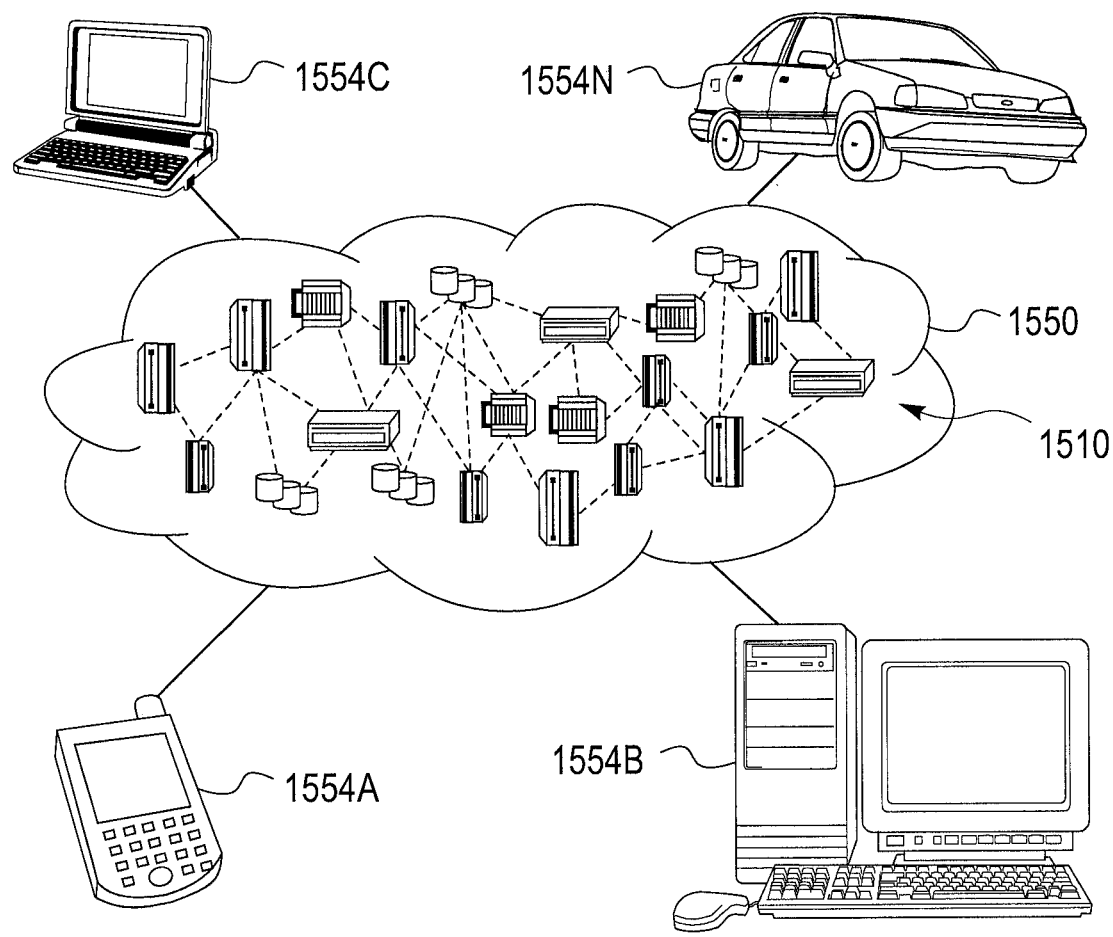
FIG. 15 is a block diagram showing an illustrative cloud computing environment having one or more cloud computing nodes with which local computing devices used by cloud consumers communicate in accordance with one embodiment.

Referring now to FIG. 15, illustrative cloud computing environment 1550 is depicted. As shown, cloud computing environment 1550 includes one or more cloud computing nodes 1510 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1510 and cloud computing environment 1550 can communicate with any type of computerized device over any type of network and/or network addressable connection (e.g., using a web browser).

Figure 16:
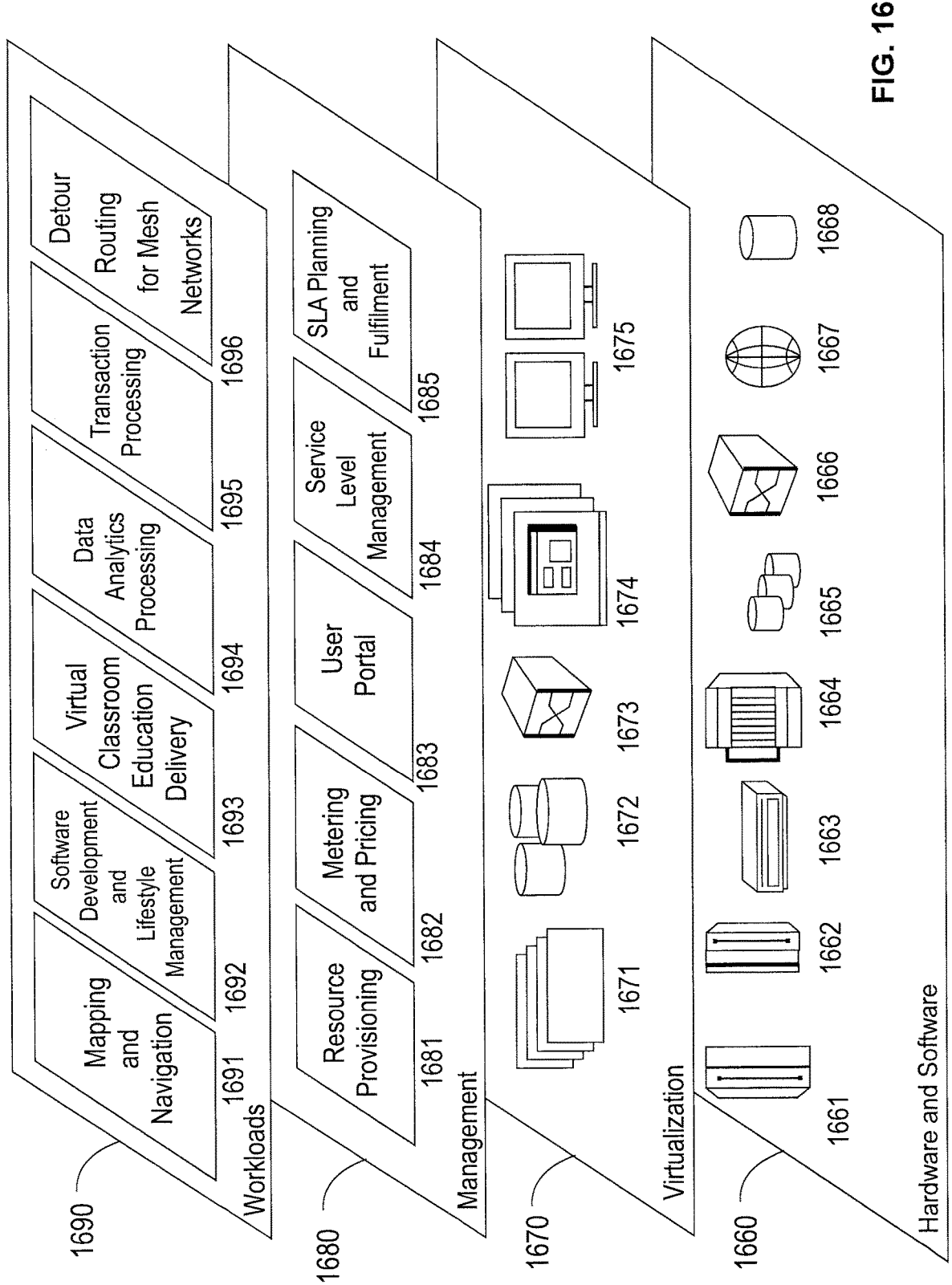
FIG. 16 is a block diagram showing a set of functional abstraction layers provided by a cloud computing environment in accordance with one embodiment.

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include: mainframes 1661; RISC (Reduced Instruction Set Computer) architecture based servers 1662; servers 1663; blade servers 1664; storage devices 1665; and networks and networking components 1666. In some embodiments, software components include network application server software 1667 and database software 1668.

Virtualization layer 1670 provides an abstraction layer from which the following examples of virtual entities may be provided: virtual servers 1671; virtual storage 1672; virtual networks 1673, including virtual private networks; virtual applications and operating systems 1674; and virtual clients 1675.

In one example, management layer 1680 may provide the functions described below. Resource provisioning 1681 provides dynamic procurement of computing resources and other resources that are utilized to perform tasks within the cloud computing environment. Metering and Pricing 1682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1683 provides access to the cloud computing environment for consumers and system administrators. Service level management 1684 provides cloud computing resource allocation and management such that required service levels are met. Service Level Agreement (SLA) planning and fulfillment 1685 provide pre-arrangement for, and procurement of, cloud computing resources for which a future requirement is anticipated in accordance with an SLA.

Workloads layer 1690 provides examples of functionality for which the cloud computing environment may be utilized. Examples of workloads and functions which may be provided from this layer include: mapping and navigation 1691; software development and lifecycle management 1692; virtual classroom education delivery 1693; data analytics processing 1694; transaction processing 1695; and detour routing for a mesh network 1696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for detour routing in a mesh network that includes a plurality of nodes and a plurality of bi-directional links connecting neighboring ones of the plurality of nodes, the method comprising:
   identifying, from among the plurality of links, any primary candidate links useable to decrease a path distance from a source node to a destination node to a short path relative to an original path;
   randomly selecting one of the primary candidate links for use, responsive to an identification of more than one of the primary candidate links that is non-defective;

identifying, from among the plurality of links, any secondary candidate links useable to decrease the path distance and orthogonal to at least one of the primary candidate links, responsive to all the primary candidate links being defective;
randomly selecting one of the secondary candidate links for use, responsive to an identification of more than one of the secondary candidate links that is non-defective;
identifying, from among the plurality of links, any tertiary candidate links useable to decrease the path distance and reverse in direction to at least one of the primary candidate links, responsive to all of the secondary links being defective; and
sending a packet from the source node to the destination node using the identified tertiary candidate links, responsive to an identification of the tertiary candidate links.

2. The computer-implemented method of claim 1, further comprising sending the packet back to a sending node through the packet input link for input, responsive to a lack of the identification of any of the tertiary candidate links.

3. The computer-implemented method of claim 1, wherein the method is performed by at least one of the plurality of nodes included in the mesh network.

4. The computer-implemented method of claim 3, further comprising discarding the packet, responsive to the packet waiting for a predetermined period of time at the at least one of the plurality of nodes.

5. The computer-implemented method of 1, further comprising:
incrementing a counter comprised in the packet each time the packet traverses one of the plurality of links; and
discarding the packet, responsive to the packet traversing a predetermined number of the plurality of links.

6. The computer-implemented method of 1, further comprising discarding the packet, responsive to the packet being rerouted more than a predetermined number of times.

7. The computer-implemented method of claim 1, further comprising:
incrementing a counter comprised in the packet each time the packet is routed to a direction away from the destination node; and
discarding the packet, responsive to the packet being routed to the direction away from the destination node a predetermined number of times.

8. The computer-implemented method of claim 1, further comprising:
incrementing a counter comprised in the packet each time the packet traverses one of the plurality of links; and
discarding the packet, responsive to counter value being greater than a predetermined value representative of the path distance from the source node to the destination node.

9. The computer-implemented method of claim 8, wherein the predetermined value comprises a sum of a bias value and the path distance.

10. The computer-implemented method of claim 1, wherein each of the plurality of nodes periodically send check-alive packets for checking whether respective ones of the plurality of links are correctly operating.

11. The computer-implemented method of claim 1, wherein each of the plurality of nodes is configured to autonomously project a link operational status of adjoining links to neighboring ones of the plurality of nodes.

12. The computer-implemented method of claim 1, wherein each of the plurality of nodes comprises a computing element and a router.

13. A computer program product for detour routing in a mesh network that includes a plurality of nodes and a plurality of bi-directional links connecting neighboring ones of the plurality of nodes, the computer program product comprising a non-transitory computer readable storage medium having program instructions embodied therewith, the program instructions executable by a computing element to cause the computing element to perform a method comprising:
identifying, from among the plurality of links, any primary candidate links useable to decrease a path distance from a source node to a destination node to a short path relative to an original path;
randomly selecting one of the primary candidate links for use, responsive to an identification of more than one of the primary candidate links that is non-defective;
identifying, from among the plurality of links, any secondary candidate links useable to decrease the path distance and orthogonal to at least one of the primary candidate links, responsive to all the primary candidate links being defective;
randomly selecting one of the secondary candidate links for use, responsive to an identification of more than one of the secondary candidate links that is non-defective;
identifying, from among the plurality of links, any tertiary candidate links useable to decrease the path distance and reverse in direction to at least one of the primary candidate links, responsive to all of the secondary links being defective; and
sending a packet from the source node to the destination node using the identified tertiary candidate links, responsive to an identification of the tertiary candidate links.

14. The computer program product of claim 13, further comprising sending the packet back to a sending node through the packet input link for input, responsive to a lack of the identification of any of the tertiary candidate links.

15. The computer program product of claim 13, wherein the method is performed by at least one of the plurality of nodes included in the mesh network.

16. The computer program product of 13, further comprising:
incrementing a counter comprised in the packet each time the packet traverses one of the plurality of links; and
discarding the packet, responsive to the packet traversing a predetermined number of the plurality of links.

17. The computer program product of claim 13, further comprising:
incrementing a counter comprised in the packet each time the packet is routed to a direction away from the destination node; and
discarding the packet, responsive to the packet being routed to the direction away from the destination node a predetermined number of times.

18. The computer program product of claim 13, further comprising:
incrementing a counter comprised in the packet each time the packet traverses one of the plurality of links; and
discarding the packet, responsive to counter value being greater than a predetermined value representative of the path distance from the source node to the destination node.

19. A system, comprising:
a mesh network including a plurality of nodes and a plurality of bi-directional links connecting neighboring ones of the plurality of nodes, wherein at least one of the plurality of nodes is configured to
- identify, from among the plurality of links, any primary candidate links useable to decrease a path distance from a source node to a destination node to a short path relative to an original path;
- randomly select one of the primary candidate links for use, responsive to an identification of more than one of the primary candidate links that is non-defective;
- identify, from among the plurality of links, any secondary candidate links useable to decrease the path distance and orthogonal to at least one of the primary candidate links, responsive to all the primary candidate links being defective;
- randomly select one of the secondary candidate links for use, responsive to an identification of more than one of the secondary candidate links that is non-defective;
- identify, from among the plurality of links, any tertiary candidate links useable to decrease the path distance and reverse in direction to at least one of the primary candidate links, responsive to all of the secondary links being defective; and
- send a packet from the source node to the destination node using the identified tertiary candidate links, responsive to an identification of the tertiary candidate links.

20. The system of claim 19, wherein each of the plurality of nodes comprises a computing element and a router.

* * * * *